US008495489B1

(12) United States Patent
Everingham

(10) Patent No.: US 8,495,489 B1
(45) Date of Patent: Jul. 23, 2013

(54) SYSTEM AND METHOD FOR CREATING AND DISPLAYING IMAGE ANNOTATIONS

(75) Inventor: James R. Everingham, Santa Cruz, CA (US)

(73) Assignee: Luminate, Inc., Mountain View, CA (US)

( * ) Notice: Subject to any disclaimer, the term of this patent is extended or adjusted under 35 U.S.C. 154(b) by 0 days.

(21) Appl. No.: 13/473,027

(22) Filed: May 16, 2012

(51) Int. Cl.
*G06F 17/00* (2006.01)
*G06F 17/30* (2006.01)

(52) U.S. Cl.
USPC ........... 715/230; 715/232; 715/234; 715/733; 715/742; 715/862; 707/621; 707/873; 707/913

(58) Field of Classification Search
USPC ............... 715/200, 201, 202, 203, 204, 205, 715/210, 226, 234, 255, 256, 273, 760, 230, 715/231, 232, 233, 700, 710, 731, 733, 737, 715/738, 740, 741, 742, 743, 751, 762, 862; 707/621, 709, 783, 912, 913, 914, 915, 917, 707/999.009, 999.01
See application file for complete search history.

(56) References Cited

U.S. PATENT DOCUMENTS

| | | |
|---|---|---|
| D297,243 S | 8/1988 | Wells-Papanek et al. |
| 4,789,962 A | 12/1988 | Berry et al. |
| 5,008,853 A | 4/1991 | Bly et al. |
| 5,199,104 A | 3/1993 | Hirayama |
| 5,287,448 A | 2/1994 | Nicol et al. |
| 5,349,518 A | 9/1994 | Zifferer et al. |
| 5,367,623 A | 11/1994 | Iwai et al. |
| 5,428,733 A | 6/1995 | Carr |
| 5,583,655 A | 12/1996 | Tsukamoto et al. |
| 5,589,892 A | 12/1996 | Knee et al. |
| 5,615,367 A | 3/1997 | Bennett et al. |
| 5,627,958 A | 5/1997 | Potts et al. |
| D384,050 S | 9/1997 | Kodosky |
| D384,052 S | 9/1997 | Kodosky |
| 5,682,469 A | 10/1997 | Linnett et al. |
| 5,684,716 A | 11/1997 | Freeman |
| 5,689,669 A | 11/1997 | Lynch et al. |
| 5,706,507 A | 1/1998 | Schloss |
| 5,721,906 A | 2/1998 | Siefert |
| 5,724,484 A | 3/1998 | Kagami |
| 5,754,176 A | 5/1998 | Crawford |
| 5,796,932 A | 8/1998 | Fox et al. |

(Continued)

OTHER PUBLICATIONS

Cascia et al., "Combining Textual and Visual Cues for Content-based Image Retrieval on the World Wide Web," IEEE Workshop on Content-based Access of Image and Video Libraries (Jun. 1998).

(Continued)

*Primary Examiner* — Maikhanh Nguyen
(74) *Attorney, Agent, or Firm* — Michael B. Rubin; Bozicevic, Field & Francis LLP

(57) ABSTRACT

Disclosed herein are computer-implemented systems and methods for allowing an end-user to create and share annotated comments, modify published images, and/or otherwise interact with images published on digital content platforms (e.g., images published on a webpage, mobile application, etc.). The systems and methods may include: (1) providing an annotation interface to allow a first end-user to create an annotation on a published image; (2) providing a comment entry interface to receive a comment from the first end-user; (3) linking the annotation and the comment; (4) identifying when a second end-user accesses the image or comment on the digital content platform; and (5) displaying the comment and/or annotation to the second end-user.

21 Claims, 12 Drawing Sheets

U.S. PATENT DOCUMENTS

| | | | |
|---|---|---|---|
| D406,828 S | 3/1999 | Newton et al. | |
| 5,933,138 A | 8/1999 | Driskell | |
| 5,956,029 A | 9/1999 | Okada et al. | |
| 6,026,377 A | 2/2000 | Burke | |
| 6,034,687 A | 3/2000 | Taylor et al. | |
| D427,576 S | 7/2000 | Coleman | |
| 6,285,381 B1 | 9/2001 | Sawano et al. | |
| D450,059 S | 11/2001 | Itou | |
| 6,414,679 B1 | 7/2002 | Miodonski et al. | |
| D469,104 S | 1/2003 | Istvan et al. | |
| 6,728,752 B1 | 4/2004 | Chen et al. | |
| 7,069,308 B2 | 6/2006 | Abrams | |
| D528,552 S | 9/2006 | Nevill-Manning | |
| D531,185 S | 10/2006 | Cummins | |
| 7,117,254 B2 | 10/2006 | Lunt et al. | |
| 7,124,372 B2 | 10/2006 | Brin | |
| 7,159,185 B1 | 1/2007 | Vedula et al. | |
| 7,231,395 B2 | 6/2007 | Fain et al. | |
| 7,233,316 B2 | 6/2007 | Smith et al. | |
| 7,251,637 B1 | 7/2007 | Caid et al. | |
| D553,632 S | 10/2007 | Harvey et al. | |
| D555,661 S | 11/2007 | Kim | |
| D557,275 S | 12/2007 | De Mar et al. | |
| D562,840 S | 2/2008 | Cameron | |
| D566,716 S | 4/2008 | Rasmussen et al. | |
| D567,252 S | 4/2008 | Choe et al. | |
| D577,365 S | 9/2008 | Flynt et al. | |
| 7,437,358 B2 | 10/2008 | Arrouye et al. | |
| 7,502,785 B2 | 3/2009 | Chen et al. | |
| D590,412 S | 4/2009 | Saft et al. | |
| 7,519,200 B2 | 4/2009 | Gokturk et al. | |
| 7,519,595 B2 | 4/2009 | Solaro et al. | |
| 7,542,610 B2 | 6/2009 | Gokturk et al. | |
| 7,558,781 B2 | 7/2009 | Probst et al. | |
| D600,704 S | 9/2009 | LaManna et al. | |
| D600,706 S | 9/2009 | LaManna et al. | |
| 7,599,938 B1 | 10/2009 | Harrison, Jr. | |
| 7,657,100 B2 | 2/2010 | Gokturk et al. | |
| 7,657,126 B2 | 2/2010 | Gokturk et al. | |
| 7,660,468 B2 | 2/2010 | Gokturk et al. | |
| D613,299 S | 4/2010 | Owen et al. | |
| D613,750 S | 4/2010 | Truelove et al. | |
| D614,638 S | 4/2010 | Viegers et al. | |
| 7,760,917 B2 | 7/2010 | Vanhoucke et al. | |
| 7,783,135 B2 | 8/2010 | Gokturk et al. | |
| 7,792,818 B2 | 9/2010 | Fain et al. | |
| D626,133 S | 10/2010 | Murphy et al. | |
| 7,809,722 B2 | 10/2010 | Gokturk et al. | |
| D629,411 S | 12/2010 | Weir et al. | |
| D638,025 S | 5/2011 | Saft et al. | |
| 7,945,653 B2 * | 5/2011 | Zuckerberg et al. | 709/223 |
| D643,044 S | 8/2011 | Ording | |
| 8,027,940 B2 | 9/2011 | Li et al. | |
| 8,036,990 B1 | 10/2011 | Mir et al. | |
| 8,055,688 B2 | 11/2011 | Giblin | |
| 8,060,161 B2 | 11/2011 | Kwak | |
| D652,424 S | 1/2012 | Cahill et al. | |
| 8,166,383 B1 | 4/2012 | Everingham et al. | |
| 8,234,168 B1 | 7/2012 | Lagle Ruiz et al. | |
| D664,976 S | 8/2012 | Everingham | |
| D664,977 S | 8/2012 | Everingham | |
| 8,250,145 B2 | 8/2012 | Zuckerberg et al. | |
| 8,255,495 B1 | 8/2012 | Lee | |
| 8,280,959 B1 | 10/2012 | Zuckerberg et al. | |
| 8,311,889 B1 | 11/2012 | Lagle Ruiz et al. | |
| 8,392,538 B1 | 3/2013 | Lee | |
| 2002/0065844 A1 | 5/2002 | Robinson et al. | |
| 2003/0050863 A1 | 3/2003 | Radwin | |
| 2003/0131357 A1 | 7/2003 | Kim | |
| 2003/0220912 A1 | 11/2003 | Fain et al. | |
| 2004/0070616 A1 | 4/2004 | Hildebrandt et al. | |
| 2005/0235062 A1 * | 10/2005 | Lunt et al. | 709/225 |
| 2005/0251760 A1 | 11/2005 | Sato et al. | |
| 2006/0155684 A1 | 7/2006 | Liu et al. | |
| 2006/0179453 A1 | 8/2006 | Kadie et al. | |
| 2006/0265400 A1 | 11/2006 | Fain et al. | |
| 2007/0118520 A1 | 5/2007 | Bliss et al. | |
| 2007/0157119 A1 | 7/2007 | Bishop | |
| 2007/0203903 A1 | 8/2007 | Attaran Rezaei et al. | |
| 2007/0219968 A1 | 9/2007 | Frank | |
| 2007/0255785 A1 * | 11/2007 | Hayashi et al. | 709/204 |
| 2007/0258646 A1 | 11/2007 | Sung et al. | |
| 2008/0079696 A1 | 4/2008 | Shim et al. | |
| 2008/0082426 A1 | 4/2008 | Gokturk et al. | |
| 2008/0091723 A1 * | 4/2008 | Zuckerberg et al. | 707/104.1 |
| 2008/0134088 A1 | 6/2008 | Tse et al. | |
| 2008/0141110 A1 | 6/2008 | Gura | |
| 2008/0163379 A1 | 7/2008 | Robinson et al. | |
| 2008/0177640 A1 | 7/2008 | Gokturk et al. | |
| 2008/0199075 A1 | 8/2008 | Gokturk et al. | |
| 2008/0208849 A1 | 8/2008 | Conwell | |
| 2008/0268876 A1 | 10/2008 | Gelfand et al. | |
| 2009/0006375 A1 | 1/2009 | Lax et al. | |
| 2009/0007012 A1 | 1/2009 | Mandic et al. | |
| 2009/0064003 A1 | 3/2009 | Harris et al. | |
| 2009/0070435 A1 | 3/2009 | Abhyanker | |
| 2009/0125544 A1 | 5/2009 | Brindley | |
| 2009/0144392 A1 * | 6/2009 | Wang et al. | 709/217 |
| 2009/0148045 A1 | 6/2009 | Lee et al. | |
| 2009/0158146 A1 | 6/2009 | Curtis et al. | |
| 2009/0159342 A1 | 6/2009 | Markiewicz et al. | |
| 2009/0165140 A1 | 6/2009 | Robinson et al. | |
| 2009/0193032 A1 | 7/2009 | Pyper | |
| 2009/0228838 A1 | 9/2009 | Ryan et al. | |
| 2009/0287669 A1 | 11/2009 | Bennett | |
| 2010/0005001 A1 | 1/2010 | Aizen et al. | |
| 2010/0005087 A1 | 1/2010 | Basco | |
| 2010/0046842 A1 | 2/2010 | Conwell | |
| 2010/0054600 A1 | 3/2010 | Anbalagan et al. | |
| 2010/0077290 A1 | 3/2010 | Pueyo | |
| 2010/0161631 A1 | 6/2010 | Yu et al. | |
| 2010/0260426 A1 | 10/2010 | Huang et al. | |
| 2010/0287236 A1 * | 11/2010 | Amento et al. | 709/204 |
| 2010/0290699 A1 | 11/2010 | Adam et al. | |
| 2010/0312596 A1 | 12/2010 | Saffari et al. | |
| 2010/0313143 A1 | 12/2010 | Jung et al. | |
| 2011/0010676 A1 | 1/2011 | Khosravy | |
| 2011/0022958 A1 | 1/2011 | Kang et al. | |
| 2011/0072047 A1 | 3/2011 | Wang et al. | |
| 2011/0082825 A1 | 4/2011 | Sathish | |
| 2011/0087990 A1 | 4/2011 | Ng et al. | |
| 2011/0131537 A1 | 6/2011 | Cho et al. | |
| 2011/0138300 A1 | 6/2011 | Kim et al. | |
| 2011/0164058 A1 | 7/2011 | Lemay | |
| 2011/0173190 A1 | 7/2011 | van Zwol et al. | |
| 2011/0184814 A1 | 7/2011 | Konkol et al. | |
| 2011/0196863 A1 | 8/2011 | Marcucci et al. | |
| 2011/0243459 A1 | 10/2011 | Deng | |
| 2011/0264736 A1 | 10/2011 | Zuckerberg et al. | |
| 2011/0276396 A1 | 11/2011 | Rathod | |
| 2011/0280447 A1 | 11/2011 | Conwell | |
| 2011/0288935 A1 | 11/2011 | Elvekrog et al. | |
| 2011/0296339 A1 | 12/2011 | Kang | |
| 2012/0005209 A1 | 1/2012 | Rinearson et al. | |
| 2012/0036132 A1 | 2/2012 | Doyle | |
| 2012/0054355 A1 | 3/2012 | Arrasvuori et al. | |
| 2012/0059884 A1 | 3/2012 | Rothschild | |
| 2012/0075433 A1 | 3/2012 | Tatzgern et al. | |
| 2012/0110464 A1 | 5/2012 | Chen et al. | |
| 2012/0158668 A1 | 6/2012 | Tu et al. | |
| 2012/0203651 A1 * | 8/2012 | Leggatt | 705/26.3 |
| 2012/0233000 A1 | 9/2012 | Fisher et al. | |
| 2012/0258776 A1 | 10/2012 | Lord et al. | |

OTHER PUBLICATIONS

Everingham et al., "'Hello! My name is . . . Buffy'—Automatic Naming of Characters in TV Video," Proceedings of the 17th British Machine Vision Conference (BMVC2006), pp. 889-908 (Sep. 2006).

FAQ from Pixazza's website as published on Feb. 22, 2010, retrieved at http://web.archive.org/web/20100222001945/http://www.pixazza.com/faq/.

Galleguillos et al., "Object Categorization using Co-Occurrence, Location and Appearance," IEEE Conference on Computer Vision and Pattern Recognition (CVPR) Anchorage, USA (2008).

Heitz & Koller, "Learning Spatial Context: Using Stuff to Find Things," European Conference on Computer Vision (ECCV) (2008).

Hoiem et al., "Putting Objects in Perspective," IJCV (80), No. 1 (Oct. 2008).

Jain et al., "Fast Image Search for Learned Metrics," Proceedings of the IEEE Conference on Computer Vision and Pattern Recognition (CVPR) (Jun. 2008).

Lober et al., "IML: An Image Markup Language," Proceedings, American Medical Informatics Association Fall Symposium, pp. 403-407 (2001).

Rao, Leena Google Ventures-Backed Pixazza Raises $12 Million for Crowdsourced 'AdSense for Images', published Jul. 18, 2010, retrieved from http://techcrunch.com/2010/07/18google-funded-pixazza-raises-12-million-for-crowdsourced-adsense-for-images/.

Russell & Torralba, "LabelMe: a database and web-based tool for image annotation," International Journal of Computer Vision, vol. 77, Issue 1-3, pp. 157-173 (May 2008).

Torralba, "Contextual Priming for Object Detection," International Journal of Computer Vision, vol. 53, Issue 2, pp. 169-191 (2003).

Venkatesan et al., "Robust Image Hashing" Image Processing Proceedings. 2000 International Conference vol. 3, 664-666 (2000).

U.S. Appl. No. 12/902,066, filed Oct. 11, 2010, Response to Non-Final Office Action Entered and Forwarded to Examiner, May 17, 2013.

U.S. Appl. No. 13/005,217, filed Jan. 12, 2011, Non Final Action Mailed, May 16, 2013.

U.S. Appl. No. 13/045,426, filed Mar. 10, 2011, Non Final Action Mailed, Apr. 5, 2013.

U.S. Appl. No. 13/151,110, filed Jun. 1, 2011, Non Final Action Mailed, Jan. 23, 2013.

U.S. Appl. No. 13/219,460, filed Aug. 26, 2011, Response to Non-Final Office Action Entered and Forwarded to Examiner, Mar. 21, 2013.

U.S. Appl. No. 13/252,053, filed Oct. 3, 2011, Non Final Action Mailed, Mar. 29, 2013.

U.S. Appl. No. 13/299,280, filed Nov. 17, 2011, Request for Continued Examination Filed, Feb. 5, 2013.

U.S. Appl. No. 13/308,401, filed Nov. 30, 2011, Non Final Action Mailed, Feb. 27, 2013.

U.S. Appl. No. 13/352,188, filed Jan. 17, 2012, Request for Continued Examination Filed, Nov. 14, 2012.

U.S. Appl. No. 13/398,700, filed Feb. 16, 2012, Final Rejection Mailed, Jan. 3, 2013.

U.S. Appl. No. 13/486,628, filed Jun. 1, 2012, Final Rejection Mailed, Mar. 27, 2013.

U.S. Appl. No. 13/599,991, filed Aug. 30, 2012, Response to Non-Final Office Action Entered and Forwarded to Examiner, Mar. 6, 2013.

U.S. Appl. No. 13/777,917, filed Feb. 26, 2013, Information Disclosure Statement, May 7, 2013.

U.S. Appl. No. 29/403,731, filed Oct. 10, 2011, Information Disclosure Statement, May 7, 2013.

U.S. Appl. No. 29/403,732, filed Oct. 10, 2011, Information Disclosure Statement, May 7, 2013.

U.S. Appl. No. 29/403,733, filed Oct. 10, 2011, Information Disclosure Statement, May 7, 2013.

U.S. Appl. No. 29/403,734, filed Oct. 10, 2011, Information Disclosure Statement, May 7, 2013.

U.S. Appl. No. 29/403,826, filed Oct. 11, 2011, Information Disclosure Statement, May 7, 2013.

* cited by examiner

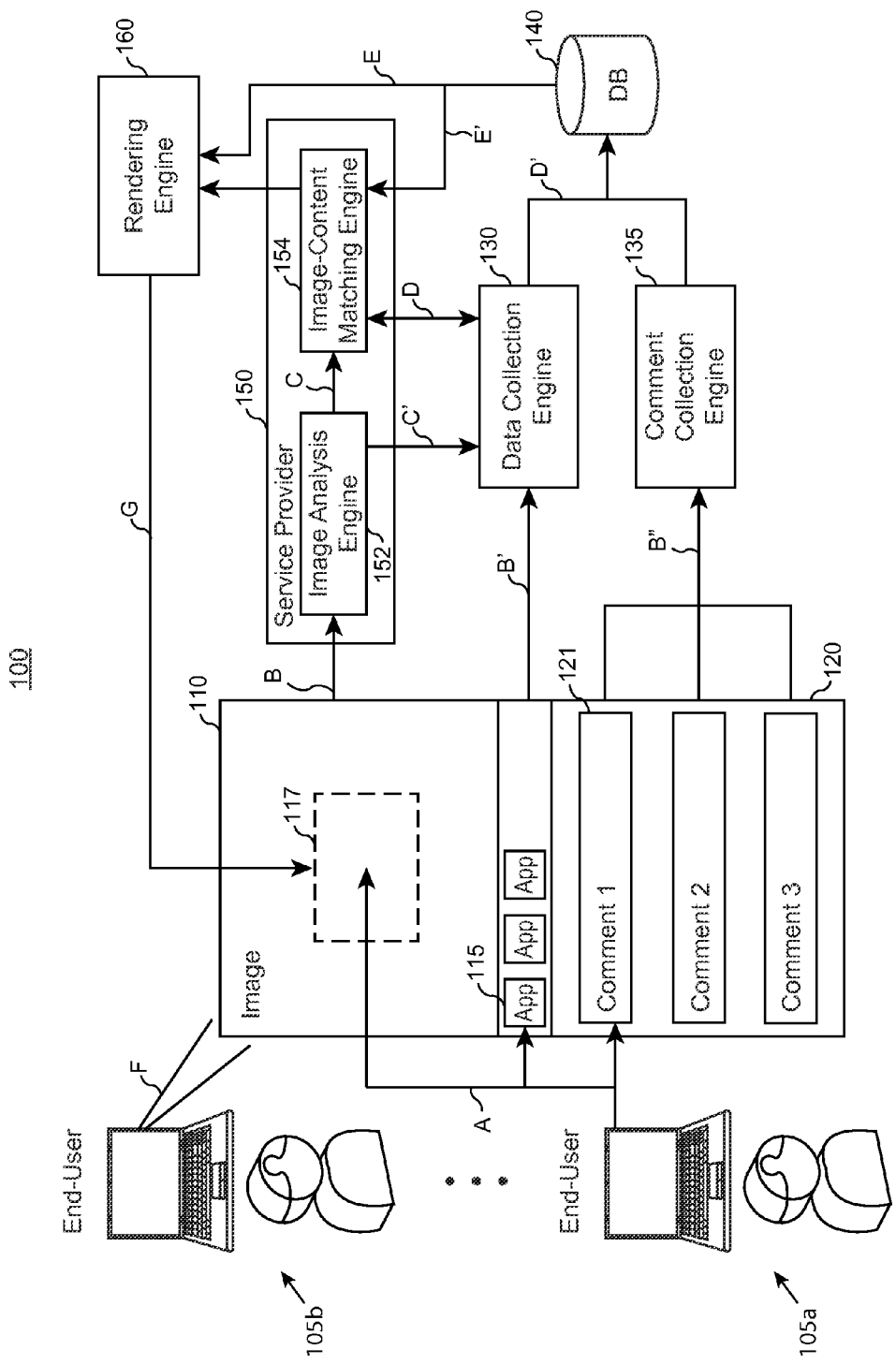

SYSTEM AND METHOD FOR CREATING AND DISPLAYING IMAGE ANNOTATIONS

SUMMARY

Disclosed herein are computer-implemented systems and methods for allowing an end-user to create and share annotated comments, modify published images, and/or otherwise interact with images published on digital content platforms (e.g., images published on a webpage, mobile application, etc.). The systems and methods may include: (1) providing an annotation interface to allow a first end-user to create an annotation on a published image; (2) providing a comment entry interface to receive a comment from the first end-user; (3) linking the annotation and the comment; (4) identifying when a second end-user accesses the image or comment on the digital content platform; and (5) displaying the comment and/or annotation to the second end-user.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

FIG. 1 is a high-level diagram illustrating an embodiment of the present invention.

DEFINITIONS

Figure 2A:
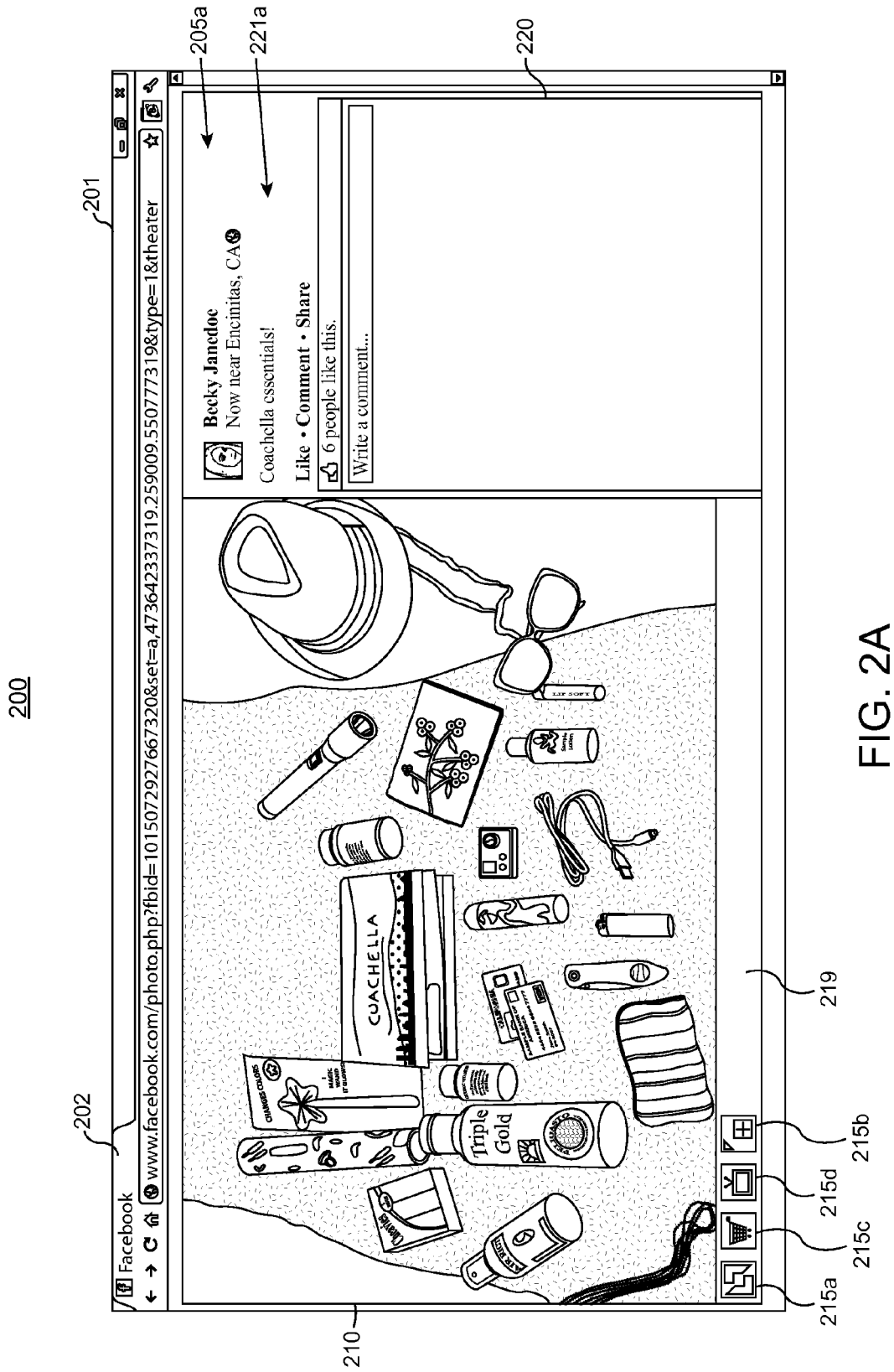
FIGS. 2A, 2B, 2C, and 2D are screenshots illustrating one implementation of the present invention.

Prior to describing the present invention in detail, it is useful to provide definitions for key terms and concepts used herein. Unless defined otherwise, all technical and scientific terms used herein have the same meaning as commonly understood by one of ordinary skill in the art to which this invention belongs.

"Advertisement" or "ad": One or more images, with or without associated text, to promote or display a product or service. Terms "advertisement" and "ad," in the singular or plural, are used interchangeably.

"Ad Creative" or "Creative": Computer file with advertisement, image, or any other content or material related to a product or service. As used herein, the phrase "providing an advertisement" may include "providing an ad creative," where logically appropriate. Further, as used herein, the phrase "providing a contextually relevant advertisement" may include "providing an ad creative," where logically appropriate.

Ad server: One or more computers, or equivalent systems, which maintains a catalog of creatives, delivers creative(s), and/or tracks advertisement(s), campaigns, and/or campaign metrics independent of the platform where the advertisement is being displayed.

"Contextual information" or "contextual tag": Data related to the contents and/or context of digital content (e.g., an image, or content within the image); for example, but not limited to, a description, identification, index, or name of an image, or object, or scene, or person, or abstraction within the digital content (e.g., image).

Contextually relevant advertisement: A targeted advertisement that is considered relevant to the contents and/or context of digital content on a digital content platform.

Crowdsource network: One or more individuals, whether human or computer, used for a crowdsourcing application.

Crowdsourcing: The process of delegating a task to one or more individuals, with or without compensation.

Digital content: Broadly interpreted to include, without exclusion, any content available on a digital content platform, such as images, videos, text, audio, and any combinations and equivalents thereof.

Digital content platform: Broadly interpreted to include, without exclusion, any webpage, website, browser-based web application, software application, mobile device application (e.g., phone or tablet application), TV widget, and equivalents thereof.

Image: A visual representation of an object, or scene, or person, or abstraction, in the form of a machine-readable and/or machine-storable work product (e.g., one or more computer files storing a digital image, a browser-readable or displayable image file, etc.). As used herein, the term "image" is merely one example of "digital content." Further, as used herein, the term "image" may refer to the actual visual representation, the machine-readable and/or machine-storable work product, location identifier(s) of the machine-readable and/or machine-storable work product (e.g., a uniform resource locator (URL)), or any equivalent means to direct a computer-implemented system and/or user to the visual representation. As such, process steps performed on "an image" may call for different interpretations where logically appropriate. For example, the process step of "analyzing the context of an image," would logically include "analyzing the context of a visual representation." However, the process step of "storing an image on a server," would logically include "storing a machine-readable and/or machine-storable work product, or location identifier(s) of the machine-readable and/or machine-storable work product (e.g., uniform resource locator (URL)) on a server." Further, process steps performed on an image may include process steps performed on a copy, thumbnail, or data file of the image.

Merchant: Seller or provider of a product or service; agent representing a seller or provider; or any third-party charged with preparing and/or providing digital content associated with a product or service. For example, the term merchant should be construed broadly enough to include advertisers, an ad agency, or other intermediaries, charged with developing a digital content to advertise a product or service.

Proximate: Is intended to broadly mean "relatively adjacent, close, or near," as would be understood by one of skill in the art. The term "proximate" should not be narrowly construed to require an absolute position or abutment. For example, "content displayed proximate to an image," means "content displayed relatively near an image, but not necessarily abutting or within the image." (To clarify: "content displayed proximate to an image," also includes "content displayed abutting or within the image.") In another example, "content displayed proximate to an image," means "content displayed on the same screen page or webpage as the image."

Publisher: Party that owns, provides, and/or controls digital content or a digital content platform; or third-party who provides, maintains, and/or controls, digital content and/or ad space on a digital content platform.

CROSS-REFERENCE TO RELATED APPLICATIONS

Except for any term definitions that conflict with the term definitions provided herein, the following related, co-owned, and co-pending applications are incorporated by reference in their entirety: U.S. patent application Ser. Nos. 12/902,066; 13/005,217; 13/005,226; 13/045,426; 13/151,110; 13/219,460; 13/252,053; 13/299,280; 13/308,401; 13/299,280; 13/427,341, which has issued as U.S. Pat. No. 8,255,495; and Ser. No. 13/450,807, which has issued as U.S. Pat. No. 8,234,168.

DETAILED DESCRIPTION

Modern trends in Internet-based content delivery have shown a heightened emphasis on digital images. Images are typically the most information-rich or information-dense content a publisher can provide. Social network sites and blogs are known to have comment streams proximate to images, wherein end-users may provide captions/comments to a published image. Besides comment streams, however, publishers and end-users seldom have the mechanisms to make images interactive, so as to provide additional/supplemental content if/when an end-user is interested in the image. Publishers also seldom have the mechanisms for allowing their readers (i.e., end-users) to modify the publishers' published images, and share such modifications with other readers.

The present invention generally relates to computer-implemented systems and methods for allowing end-users to create and share annotated comments, modify published images, and/or otherwise interact with images published on digital content platforms. For example, the systems and methods presented generally include: (1) providing an end-user with an interface to create and/or modify content, or otherwise interact with a published image; (2) providing a mechanism to identify when a second end-user has accessed the image; and (3) rendering, to the second end-user, the first end-user's creation, modification, and/or interaction with the image. In one example embodiment, there is provided systems and sub-systems to: (1) provide an annotation interface to allow a first end-user to create an annotation on an image published on a digital content platform; (2) provide a comment entry interface to receive a comment from the first end-user; (3) link the annotation and the comment; (4) identify when a second end-user accesses the image or comment on the digital content platform; and (5) display, highlight, or otherwise draw attention to the comment and/or annotation to the second end-user.

The following detailed description of the figures refers to the accompanying drawings that illustrate exemplary embodiments. Other embodiments are possible. Modifications may be made to the embodiments described herein without departing from the spirit and scope of the present invention. Therefore, the following detailed description is not meant to be limiting.

FIG. 1 is a high-level diagram illustrating an embodiment 100, of the present invention. More specifically, FIG. 1 illustrates a system 100 for providing end-users the opportunity to comment on and annotate images published on a digital content platform (e.g., a webpage, mobile application, etc.). In FIG. 1, an end user 105*a* accesses image 110 on a digital content platform. The image 110 can include one or more enabled in-image applications (or "apps") 115, which allow the end-user 105*a* to interact with the image 110. Example systems and methods for providing and enabling in-image apps are discussed in more detail in the above-referenced applications; e.g., U.S. patent application Ser. No. 13/308,401. In one embodiment, at least one in-image app 115 is configured to allow the end-user 105*a* to create one or more annotations 117 on the image 110. Annotations may include any additions, modifications, hyperlinks, actions, and/or interactions with the image 110. In other embodiments, any equivalent system or means for allowing the end-user to interact or annotate the image may be provided. In other words, the "app tray" or "app interface" shown in FIG. 1, is only one example of a mechanism for allowing annotation; other mechanisms include software tools, widgets, stylus touch interfaces, touch-screens, etc.

As common with social network and blog platforms, a comment stream 120 is provided proximate (e.g., below) the image 110 to allow the end-user 105*a* to leave a comment or caption to the image 110. For example, the end-user 105*a* can enter an individual comment 121 in the form of an alphanumeric character string. The system 100 of FIG. 1, however, provides a means for linking the annotation 117 and the individual comment 121, in order to share both the annotation and the comment with a second end-user 105*b*. More specifically, FIG. 1 shows the system 100 comprising sub-systems such as: (1) a service provider (for image analysis and content matching) system 150; (2) a data collection engine 130; (3) a comment collection engine 135; and/or (4) a rendering engine 160. While each sub-system has been compartmentalized, one of skill in the art would understand that the sub-systems, and associated processing modules, may be combined and/or controlled in various different ways.

The service provider 150 includes sub-systems of an image analysis engine 152 and an image-content matching engine 154. The image analysis engine 152 is configured to identify the image 110, and analyze the image to identify the context/content within the image. The image analysis engine 152 may include sub-protocols and sub-processing units, such as image recognition algorithms, a crowdsource network to analyze the image, and/or proximate text recognition to obtain contextual clues of the context/content within the image based on text published proximate to the image. The image-content matching engine is configured to identify contextually relevant, third-party content (e.g., ads provided by merchants/advertisers) that can be linked to the image 110. Examples of service provider systems (including image analysis and image-content matching) are discussed in more detail in the above-referenced applications.

The data collection engine 130 is configured to receive application (e.g., annotation) data from the digital content platform and/or image data from one or both of the image analysis engine 152 and image-content matching engine 154. For example, the data collection engine 130 may include one or more processing units configured to receive (in push/pull fashion) data from the various sub-systems. The comment collection engine 135, and associated processing units, is configured to receive (in push/pull fashion) one or more of the individual comment strings 121 (or comment string identifiers) from the digital content platform. The image and/or application data from the data collection engine 130 and the comment data from the comment collection engine 135 is then linked and stored in a database (or equivalent storage units) 140. From the database 140, linked data may be sent to the image-content matching engine 154 for additional content matching processing (e.g., based on the linkage and/or comment(s)), or sent directly to a rendering engine 160. When a second end-user 105*b* access the image 110, the rendering engine 160 (and associated processing units) is configured to display, highlight, or otherwise provide the first end-user's annotation 117 and/or any matched content from the image-content matching engine 154 (e.g., merchant advertisements matched to the image, comment, and/or annotation). The second end-user 105b can access the image 110, the annotation 117, and/or one or more individual comments 121 by means such as clicking, mousing-over, uploading, downloading, viewing, or otherwise enabling the image, the annotation, or the comment(s).

Lines A-G illustrate the above-described process flow of the system 100. Line A, for example, is indicative of the first end-user 105a accessing the image 110 to insert a comment 121 and an annotation 117. Lines B, B', and B" are indicative of data flows (in parallel or series) to the service provider 150, the data collection engine 130, and the comment collection engine 135, respectively. Lines C and C' are indicative of data flows (in parallel or series) to the image-content matching engine 154 and the data collection engine 130, respectively. Lines D and D' are indicative of data flows (in parallel or series) to the data collection engine 130 and the database 140. Lines E and E' are indicative of data flows (in parallel or series) to the image-content matching engine 154 and the rendering engine 160. When a second end-user 105b accesses the image 110 and/or the comment 121 (or one or more hotspots indicative of the annotation 117), as indicated by Line F, the rendering engine 160 displays content to the second end-user 105b, as indicated by Line G, in the form of the annotation 117, a highlighting of the comment 121, presentation/display of contextually relevant third-party content or advertisements, etc. One of skill in the art would recognize that one or more of the above-described process flows can be supplemented, omitted, or redirected without departing from the spirit of the present invention. For example, in an alternative embodiment, a process flow may be provided from the data collection engine 130 and/or comment collection engine 135 to the image analysis engine 152 and/or image-content matching engine 154. As such, the functions of the image analysis engine 152 and/or image-content matching engine 154 may be supplemented by data received from the data collection engine 130 and/or comment collection engine 135.

FIGS. 2A, 2B, 2C, and 2D are screenshots illustrating a "data creation" implementation 200, of the present invention. For example, FIG. 2A illustrates an image 210 published on the social network website Facebook™ 202, as viewed within a web browser 201. In FIG. 2A, a first end-user (Becky Janedoe) 205a has published an image 210, as well as a comment/caption to the image ("Coachella essentials!") 221a. Such publication and captioning is common on social network websites (i.e., user generated content (UGC) sites). The present invention, however, provides an icon (or application) tray 219 with multiple in-image applications 215a, 215b, 215c, and 215d to allow one or more end-users to interact with the published image 210. The icon tray 219 may be an "always" enabled feature, or may be enabled by the end-user's "clicking" or activation of a hotspot icon 215a.

Figure 2B:
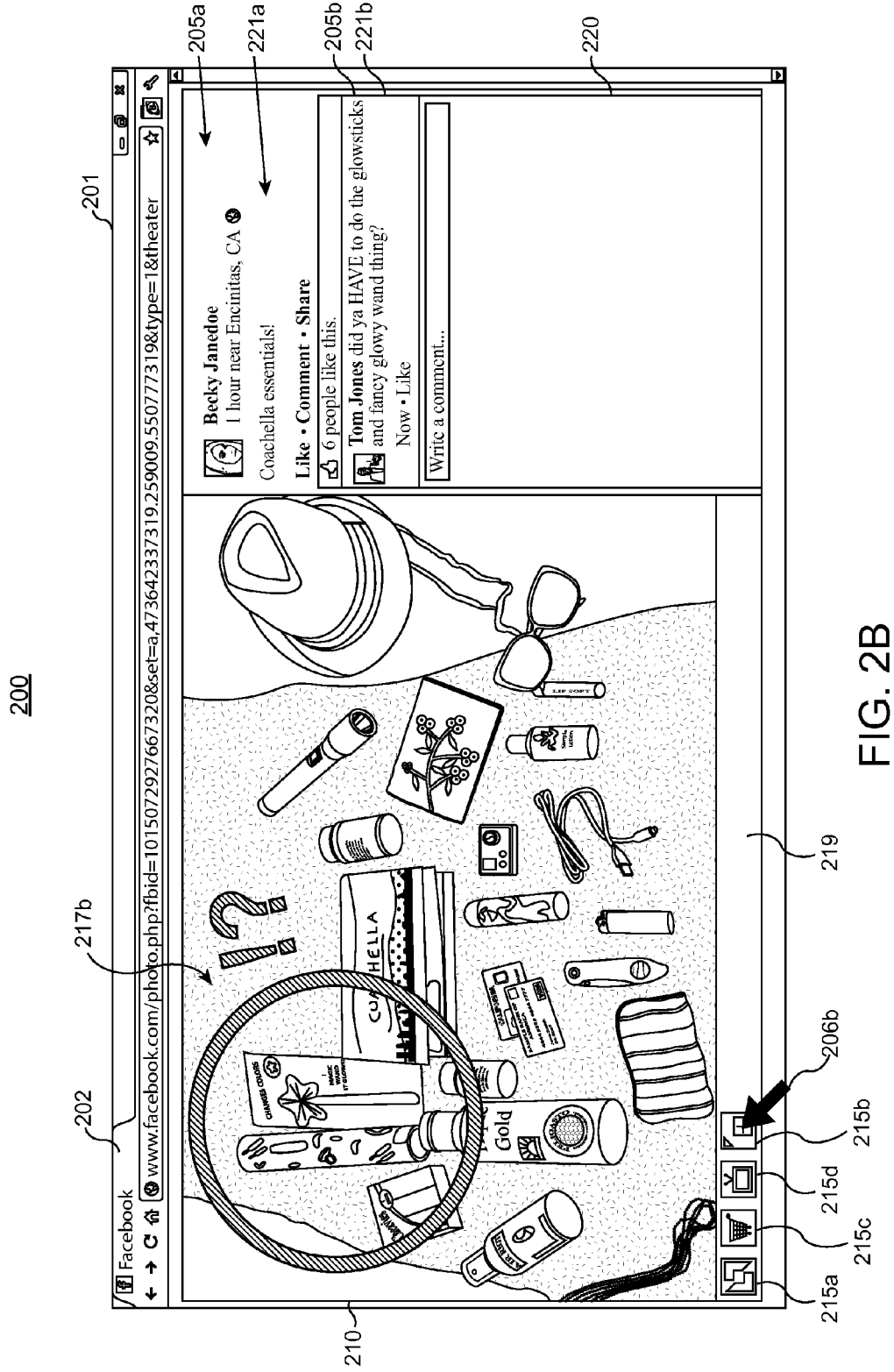

FIG. 2B, for example, shows a second end-user (Tom Jones) 205b interacting with the image 210. In practice, the second end-user 205b can enter an individual comment 221b and use an annotation in-image application 215b to annotate the image 210. The second end-user 205b clicks on the annotation in-image application 215b, with a cursor 206b, and then draws an annotation 217b; such as a circle, exclamation point, and question mark. The annotation 217b is then linked to the comment 221b, as described above.

Figure 2C:
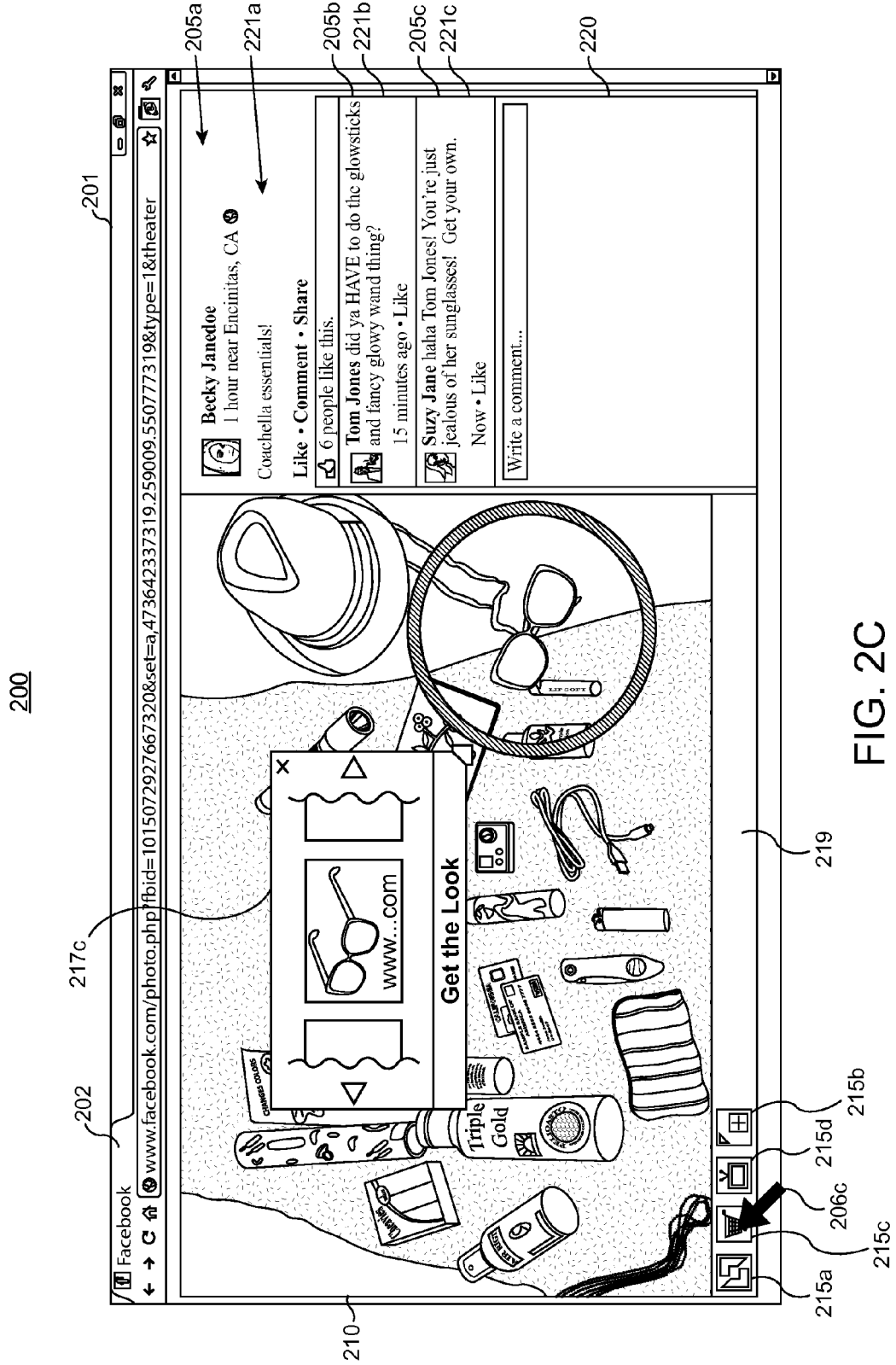

FIG. 2C shows a third end-user (Suzy Jane) 205c interacting with the image 210.

The third-end user 205c can activate a "market" or "shopping" in-image application 215c, by clicking the in-image application 215c icon with her cursor 206c. The third-end user 205c can then select (or draw a circle around) content within the image 210 that she wishes to highlight as an interesting object for purchase (e.g., the sunglasses). The third-end user 205c can then link the object to one or more third-party sites for purchase of the object (or a related object) in an annotation pop-up window (or frame) 217c. In alternative embodiments, the service provider 150 may provide advertisements and/or ad creatives within the annotation frame 217c based on an output from image-content matching engine 154. Similar ad creative display frames are discussed in more detail in the above-reference applications; e.g., U.S. patent application Ser. No. 13/252,053. The third-end user 215c may also provide an individual comment 221c within the comment stream 220. The third individual comment 221c is then linked to the annotation 217c.

Figure 2D:
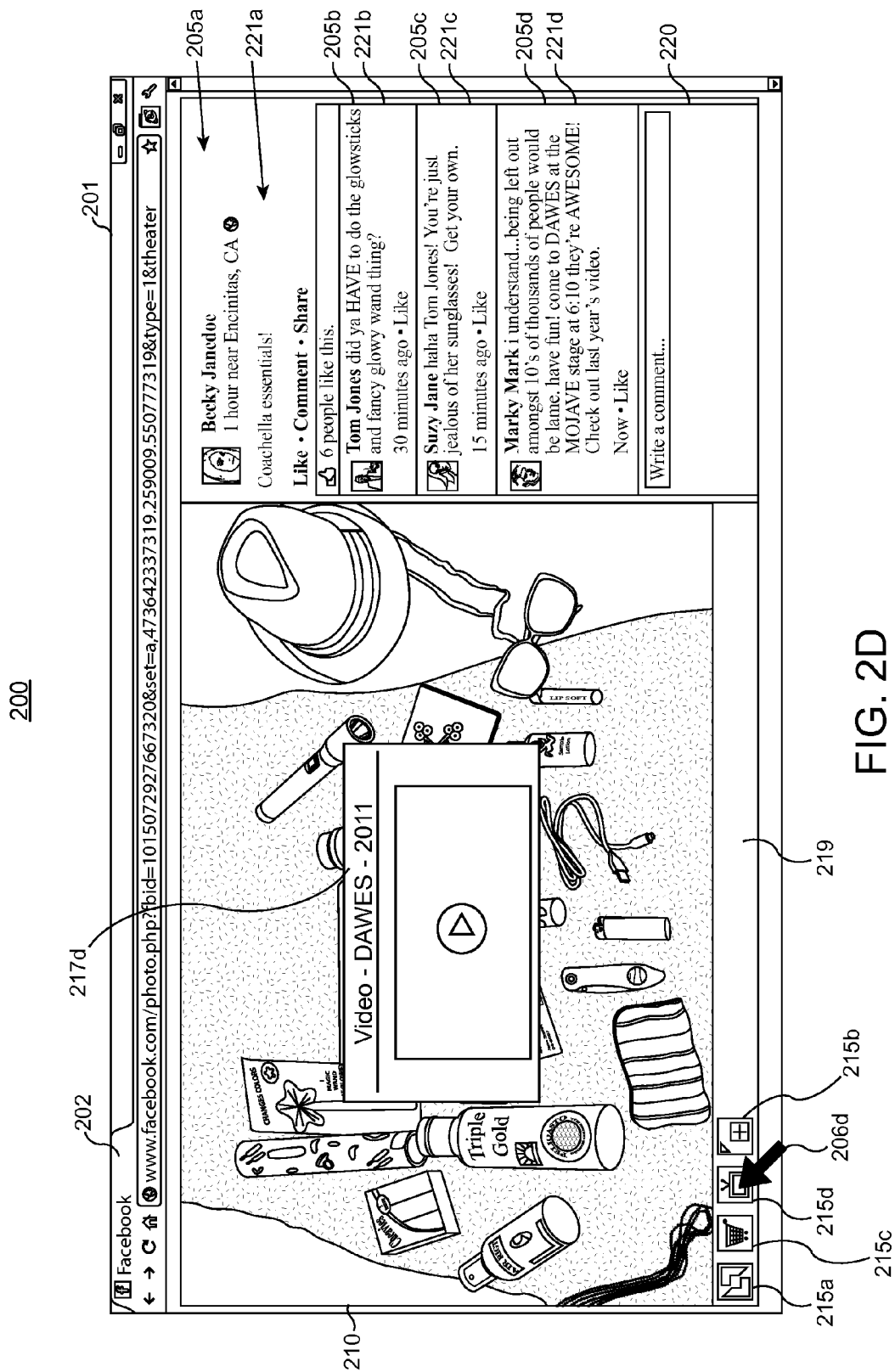

FIG. 2D illustrates a fourth end-user (Marky Mark) 205d providing a fourth individual comment 221d, and annotating the comment with a video 217d. In practice, the fourth end-user 205d implements an in-image application 215d, which links a contextually related video annotation 217d to the image 210. The fourth end-user 205d can provide the link himself. Alternatively, the service provider 150 can use image analysis engine 152, data collection engine 130, and/or comment collection engine 135 to identify the context of the image and/or comment. The service provider 150 can then use the image-content matching engine 154 to identify and link a video that is contextually relevant to the image and/or comment, based on the collected data. In alternative embodiments, one or more third-party application providers may implement one or more of the above-described steps based on the collected data. The annotation data 217d is then linked to the individual comment 221d

Figure 3A:
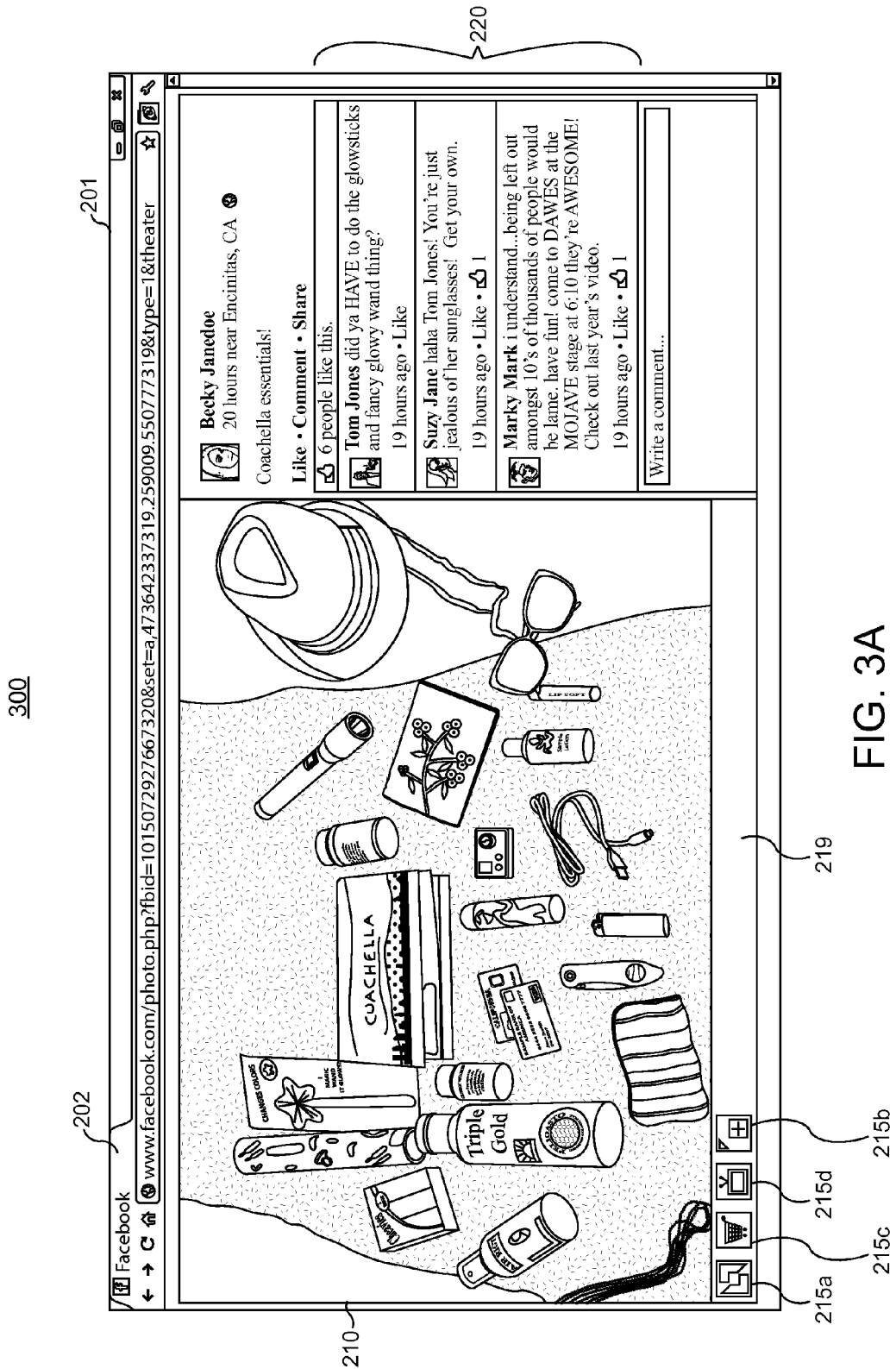
FIGS. 3A, 3B, 3C, and 3D are screenshots illustrating one implementation of the present invention.
Figure 3B:
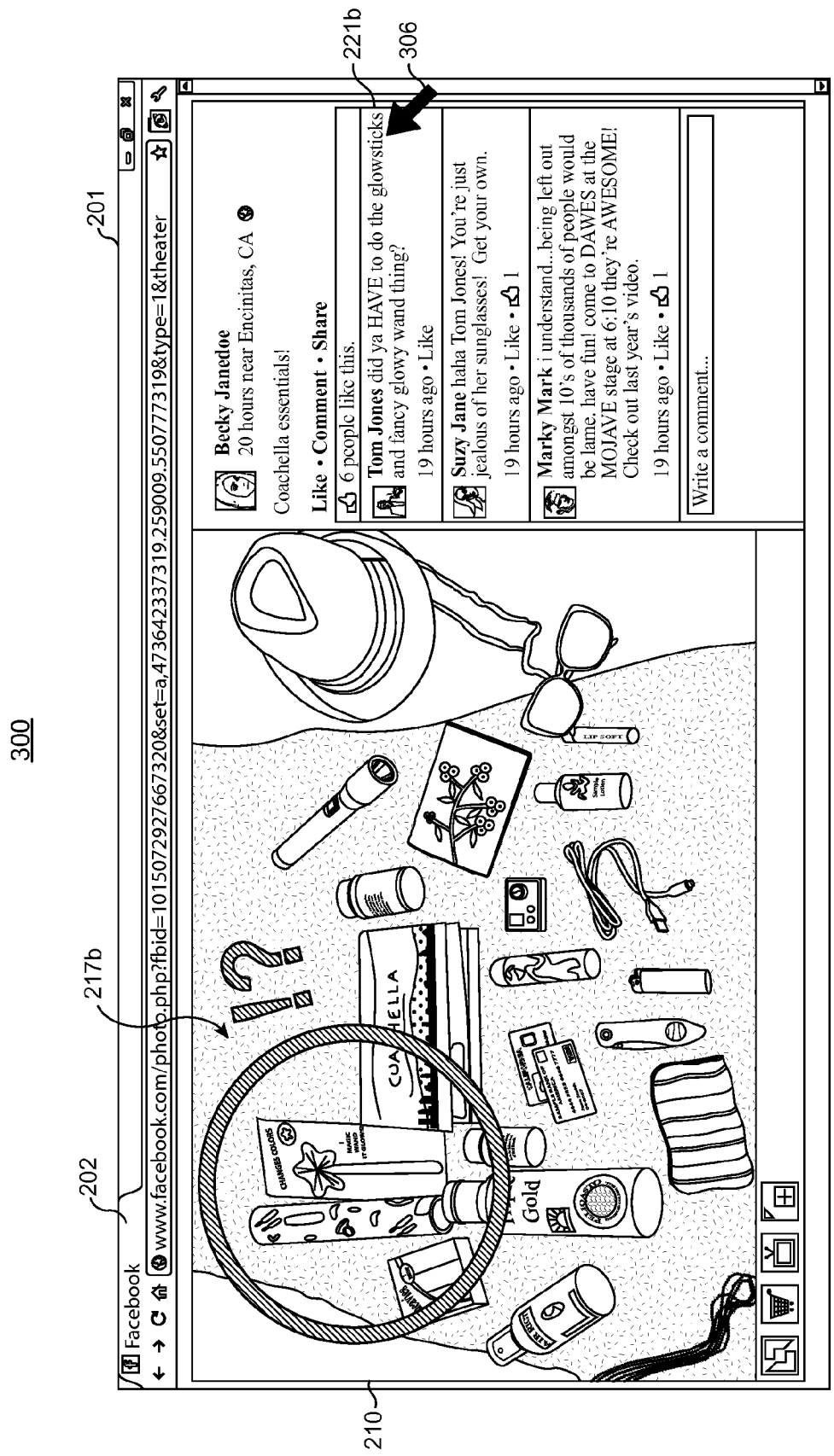
Figure 3C:
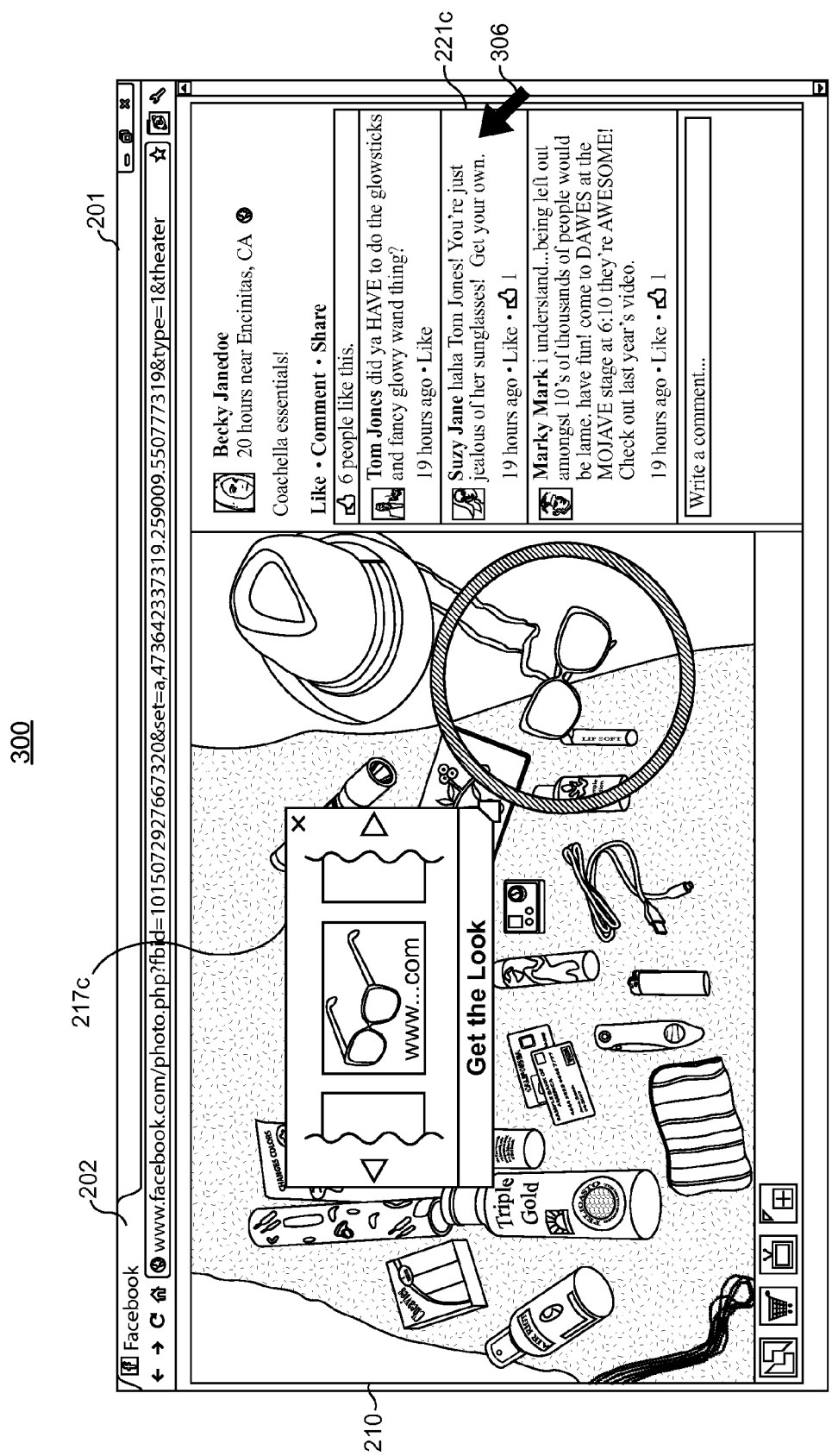
Figure 3D:
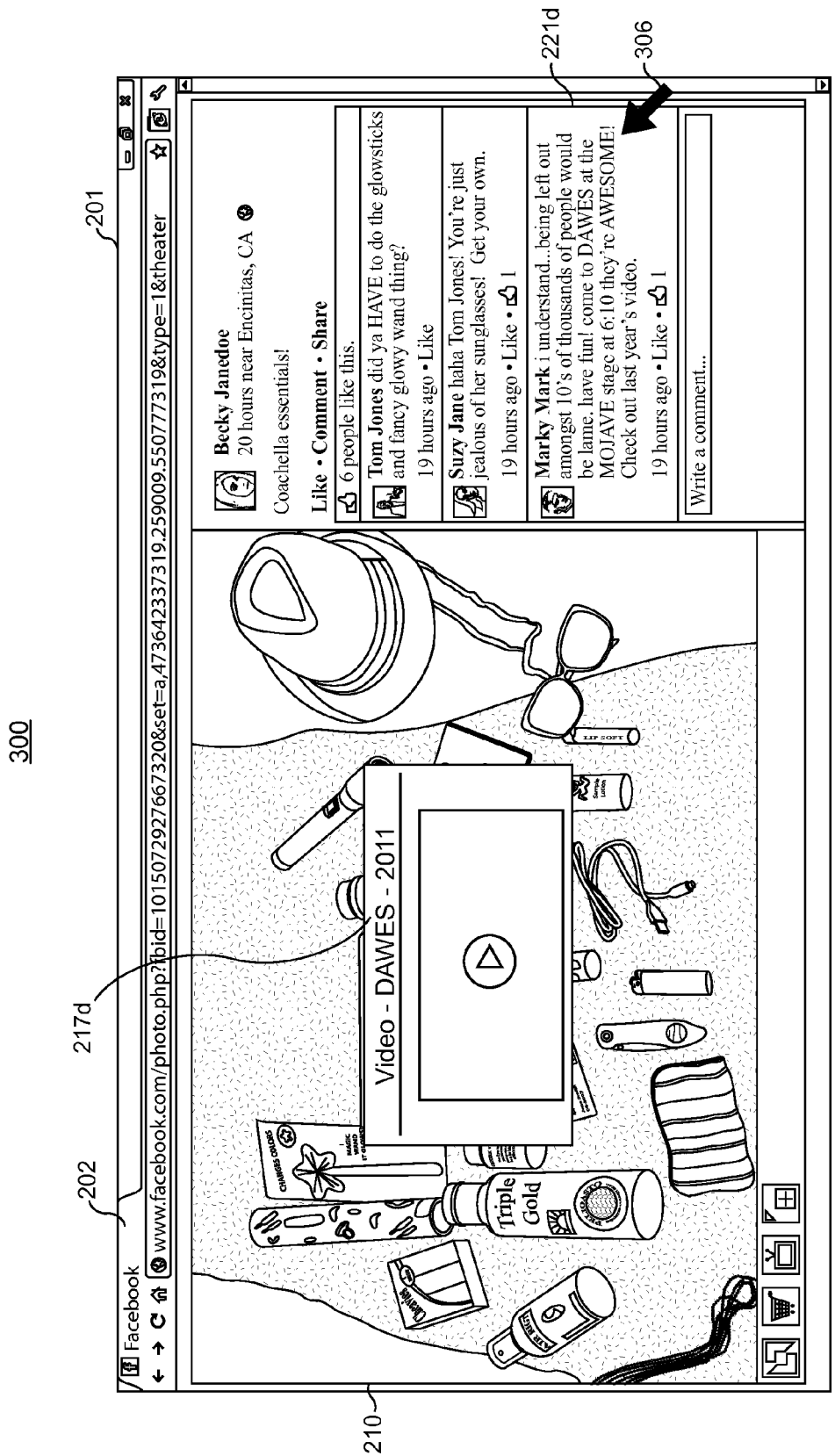

FIGS. 3A, 3B, 3C, and 3D are screenshots illustrating a "data display" implementation 300, of the present invention. FIG. 3A illustrates what a fifth end-user may see upon accessing the image 210 on the social networking website 202. As shown, comments within the comment stream 220 are provided and viewable by the fifth end-user. FIGS. 3B, 3C, and 3D, however, illustrate how the fifth end-user can use their cursor 306 to access individual comments and view the annotations created and linked to those individual comments. For example, as shown in FIG. 3B, when the fifth end-user mouses-over the second-end user's comment 221b, the rendering engine 160 draws from the database 140 to identify the annotation data that has been linked to the second-end user's comment 221b. The rendering engine 160 can then render the second end-user's annotation 217b to the fifth end-user. When the fifth end-user mouses-over the third end-user's comment 221c, as shown in FIG. 3C, the rendering engine 160 performs a similar process to render the third end-user's annotation 217c. Similarly, when the fifth end-user mouses-over the fourth end-user's comment 221d, as shown in FIG. 3D, the rendering engine performs a similar process to render the fourth end-user's annotation 217d. Alternatively, the fifth end-user can click on the hotspot icon 215a to highlight one or more annotations and/or annotated comments linked to the image 210. Various alternative implementations and combinations are available with the systems and methods described herein. As such the present invention provides a highly interactive image modification and sharing tool for publishers and end-users.

Figure 4:
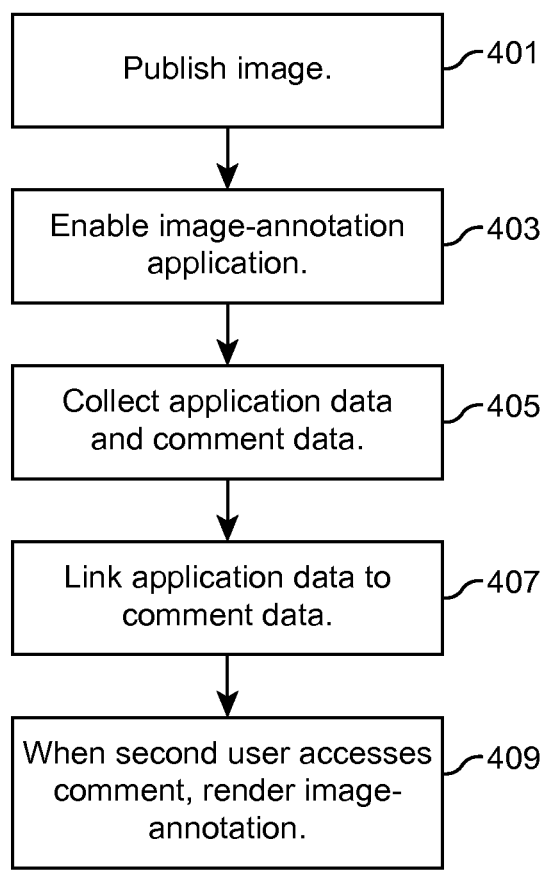
FIG. 4 is a flowchart illustrating one embodiment of the present invention.

FIG. 4 is a flowchart illustrating an embodiment 400, of the present invention. In step 401, the image is published. The image may be published by various entities; such as, an online publisher, blogger, user on a user generated content site, user of a mobile application, etc. The image can be published on one or more digital content platforms; such as, a webpage, mobile application, TV widget, software application, etc. In step 403, one or more in-image applications are enabled. The in-image applications may be enabled by the user or publisher. A dedicated in-image application icon (or hotspot) may be provided, or the in-image application may be an "always on" function. In step 405, data is collected on any one or more comments provided on the image, as well as data from the in-image application. In step 407, the application data is linked to the respective comment data. In step 409, an identification (or determination) is made of when a second user accesses the comment, at which point the application data is used to render a corresponding image-annotation.

Figure 5:
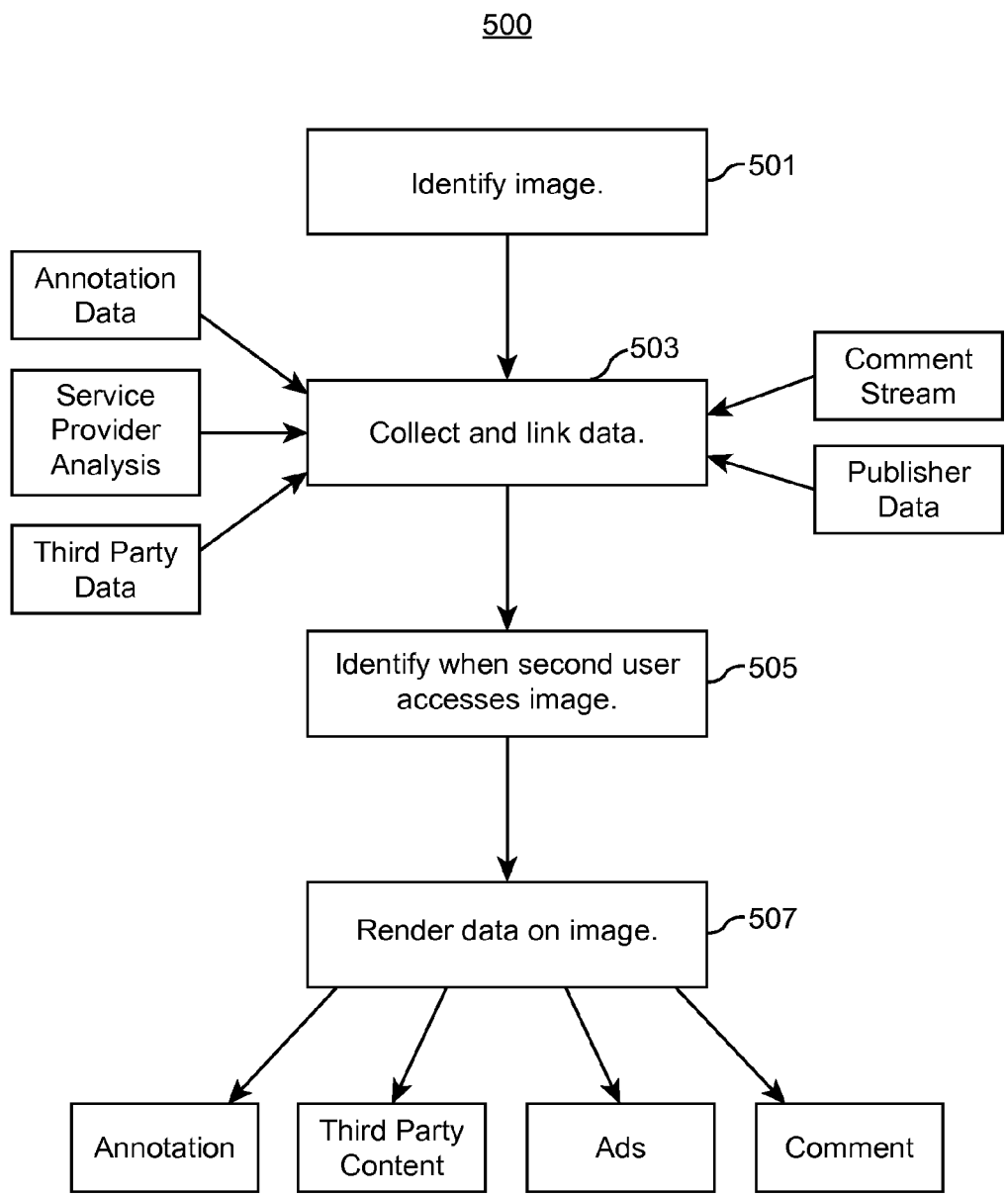
FIG. 5 is a flowchart illustrating one embodiment of the present invention.

FIG. 5 is a flowchart illustrating an embodiment 500, of the present invention. In step 501, a published image is identified by one or more processing modules. In step 503, data is collected and linked. Such data may come from various sources; such as, annotation (or application) data, service provider analysis, third-party data, comment stream(s), publisher data, etc. In step 505, an identification (or determination) is made of when a second user has accessed (e.g., clicked, viewed, downloaded, moused-over) the image (or a comment, hotspot, etc. of the image). In step 507, the collected data is rendered on the image. Such rendered data may include: annotation(s), third-party content, ads, comment(s), etc.

Additional Embodiments

In one embodiment, there is provided computer-implemented systems and methods for allowing users to create and share annotated comments on images published on digital content platforms. The systems and methods include: (1) providing an annotation interface to allow a first end-user to create an annotation on an image published on a digital content platform; (2) providing a comment entry interface to receive a comment from the first end-user; (3) receiving and linking the annotation and the comment; (4) identifying when a second end-user accesses the image, comment, and/or annotation on the digital content platform; and (5) displaying the annotation and/or comment to the second end-user. The comment can be in the form of a character string or any equivalent thereof. The digital content platform can be a webpage (e.g., social network), mobile application, or equivalent thereof. The systems and methods may further include: (6) matching the image, annotation, or comment to an advertisement, and (7) displaying the advertisement to the second end-user proximate to the annotation. The advertisement may be contextually relevant to the image, annotation, and/or comment. The systems and methods may further include (8) submitting the image, annotation, and/or comment to an image analysis engine to match the image, annotation, or comment to an advertisement. The image analysis engine may include an image recognition engine, a crowdsource network, or proximate text recognition engine. The annotation interface may be a third-party in-image application, or an interface provided by the digital content platform. The annotation may be any form of a modification or addition to the image; including a link to a third-party website and/or second digital content platform.

In another embodiment, there is provided a computer-implemented method for allowing an end-user to create and share annotated comments on an image published on a digital content platform. The method is performed by a computer processor. The method comprises: (1) providing an annotation interface to allow a first end-user to create an annotation on an image published on a digital content platform; (2) providing a comment entry interface to receive a comment from the first end-user; (3) receiving and linking the annotation and the comment; (4) identifying when a second end-user accesses the image on the digital content platform; and (5) displaying the annotation and comment to the second end-user.

In still another embodiment, there is provide a system comprising: (1) a digital content platform; (2) an interface configured to allow users to enter comments and/or annotations to images published on the digital content platform; (3) an image analysis engine configured to analyze the context/content within the image; (4) an image-content matching engine configured to match the image with contextually relevant content (e.g., advertisements); (5) a data collection engine configured to collect application (e.g., annotation) data from the digital content platform, as well as data from the image analysis engine and/or image-content matching engine; (6) a comment collection engine configured to collect the comments provided on the digital content platform; (7) a database for linking and/or storing the application data, analysis data, and the comment data; and (8) a rendering engine configured to identify when a second end-user has accessed the image, comment, and/or annotation, and display the annotation and/or comment to the second end-user. The rendering engine can also be configured to perform any modification to the comment stream in order to highlight to the second end-user that the comment(s) are related to the displayed annotation.

In another embodiment, there is provide computer-implemented systems and methods for allowing an end-user to create and share content (e.g., annotated images/comments) on an image published on a digital content platform (e.g., webpage, mobile application, etc.). The systems and methods include: (1) means for providing an annotation interface to allow a first end-user to create an annotation on an image published on a digital content platform; (2) means for providing a comment entry interface; (3) means for receiving a comment from the first end-user; (4) means for receiving, linking, and/or storing the annotation and the comment in a database; (5) means for identifying when a second end-user accesses the image, comment, or annotation on the digital content platform; and (6) means for display the annotation and/or comment to the second end-user. The comment may be in the form of a character (e.g., alpha-numeric) string. The digital content platform is a webpage (e.g., social network), a mobile application (e.g., a downloadable application for a mobile phone or tablet). The systems and methods may further include: (6) means for matching the image, annotation, or comment to an advertisement; (7) means for displaying the advertisement to the second end-user proximate to the annotation; and/or (8) means for submitting the image, annotation, or comment to an image analysis engine to match the image, annotation, or comment to an advertisement. The advertisement can be contextually relevant to the image, annotation, or comment. The image analysis engine may include means for image recognition, means for processing the image through a crowdsource network, and/or means for proximate text recognition. The annotation interface may be a third-party in-image application. The annotation may include any modification or addition to the image, and/or any link to a third-party website or second digital content platform.

Communication Between Parties Practicing the Present Invention.

In one embodiment, communication between the various parties and components of the present invention is accomplished over a network consisting of electronic devices connected either physically or wirelessly, wherein digital information is transmitted from one device to another. Such devices (e.g., end-user devices and/or servers) may include, but are not limited to: a desktop computer, a laptop computer, a handheld device or PDA, a cellular telephone, a set top box, an Internet appliance, an Internet TV system, a mobile device or tablet, or systems equivalent thereto. Exemplary networks include a Local Area Network, a Wide Area Network, an organizational intranet, the Internet, or networks equivalent thereto. The functionality and system components of an exemplary computer and network are further explained in conjunction with FIG. 6, below.

Computer Implementation.

Figure 6:
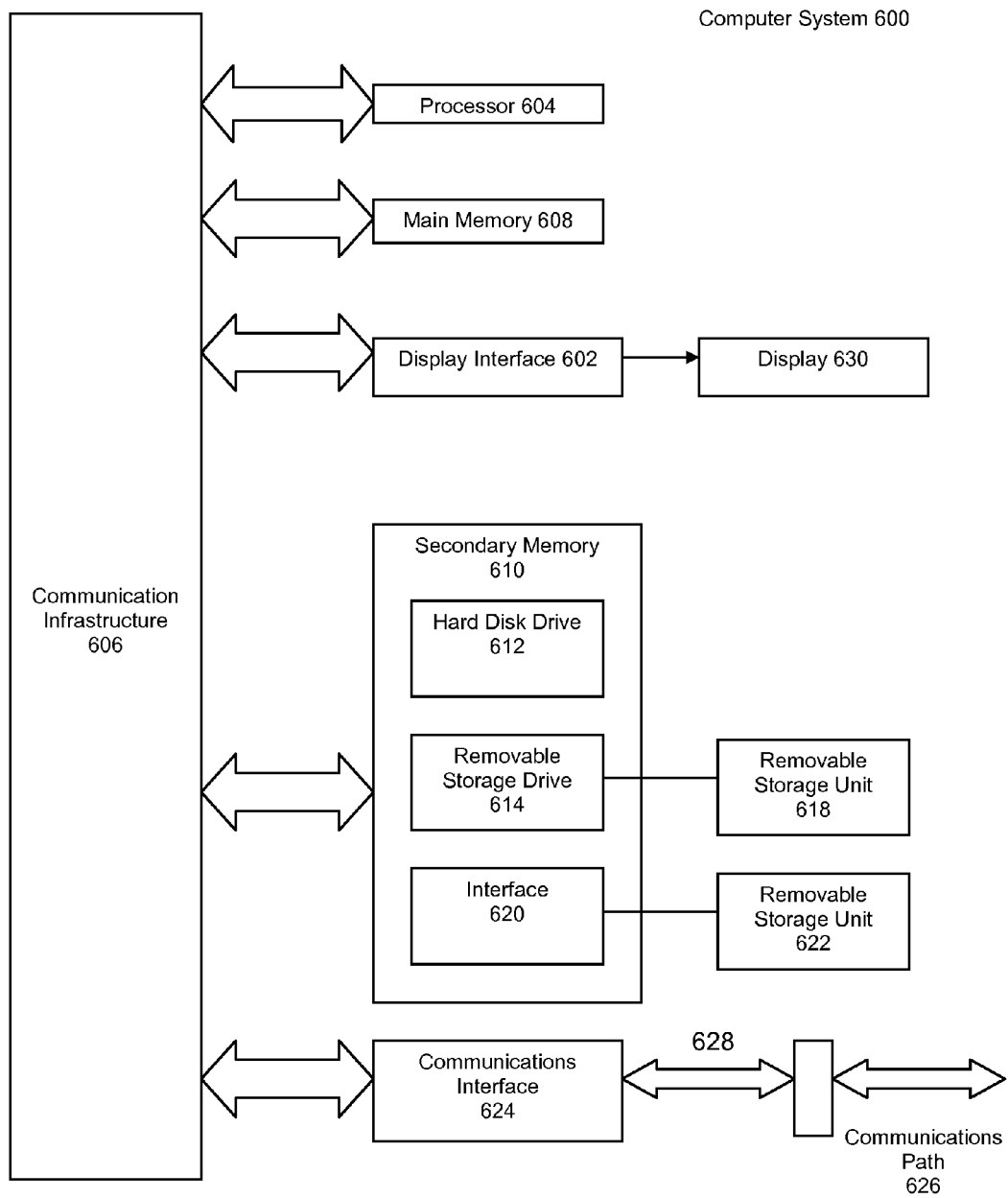
FIG. 6 is a schematic drawing of a computer system used to implement the methods presented.

In one embodiment, the invention is directed toward one or more computer systems capable of carrying out the functionality described herein. For example, FIG. 6 is a schematic drawing of a computer system 600 used to implement the methods presented above. Computer system 600 includes one or more processors, such as processor 604. The processor 604 is connected to a communication infrastructure 606 (e.g., a communications bus, cross-over bar, or network). Computer system 600 can include a display interface 602 that forwards graphics, text, and other data from the communication infrastructure 606 (or from a frame buffer not shown) for display on a local or remote display unit 630.

Computer system 600 also includes a main memory 608, such as random access memory (RAM), and may also include a secondary memory 610. The secondary memory 610 may include, for example, a hard disk drive 612 and/or a removable storage drive 614, representing a floppy disk drive, a magnetic tape drive, an optical disk drive, flash memory device, etc. The removable storage drive 614 reads from and/or writes to a removable storage unit 618. Removable storage unit 618 represents a floppy disk, magnetic tape, optical disk, flash memory device, etc., which is read by and written to by removable storage drive 614. As will be appreciated, the removable storage unit 618 includes a computer usable storage medium having stored therein computer software, instructions, and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow computer software, instructions, and/or data to be transferred from the removable storage unit 622 to computer system 600.

Computer system 600 may also include a communications interface 624. Communications interface 624 allows computer software, instructions, and/or data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to media such as removable storage drive 614, removable storage units 618, 622, data transmitted via communications interface 624, and/or a hard disk installed in hard disk drive 612. These computer program products provide computer software, instructions, and/or data to computer system 600. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the presented methods. Accordingly, such computer programs represent controllers of the computer system 600. Where appropriate, the processor 604, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 600 using removable storage drive 614, interface 620, hard drive 612, communications interface 624, or equivalents thereof. The control logic (software), when executed by the processor 604, causes the processor 604 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

Embodiments of the invention, including any systems and methods described herein, may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium, for allowing an end-user to create and share annotated comments on an image published on a digital content platform. The computer-readable storage medium includes instructions, executable by at least one processing device, that when executed cause the processing device to: (1) provide an annotation interface to allow a first end-user to create an annotation on an image published on a digital content platform; (2) provide a comment entry interface to receive a comment from the first end-user; (3) receive, link, and store the annotation and the comment in a database; (4) identify when a second end-user accesses the image, comment, or annotation on the digital content platform; and (5) display the annotation and/or comment to the second end-user. The comment may be in the form of a character (e.g., alpha-numeric) string. The digital content platform may be a webpage (e.g., social network), a mobile application (e.g., a downloadable application for a mobile phone or tablet), or any equivalent platform. The computer-readable storage medium may further include instructions, executable by at least one processing device, that when executed cause the processing device to: (6) match the image, annotation, or comment to an advertisement; (7) display the advertisement to the second end-user proximate to the annotation; and/or (8) submit the image, annotation, or comment to an image analysis engine to match the image, annotation, or comment to an advertisement. The advertisement can be contextually relevant to the image, annotation, or comment. The image analysis engine may include an image recognition engine, a crowdsource network, or a proximate text recognition engine. The annotation interface may be a third-party in-image application. The annotation may include any modification or addition to the image, and/or any link to a third-party website or second digital content platform.

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible. Further, each system component and/or method step presented should be considered a "means for" or "step for" performing the function described for said system component and/or method step. As such, any claim language directed to a "means for" or "step for" performing a recited function refers to the system component and/or method step in the specification that performs the recited function, as well as equivalents thereof.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A non-transitory computer-readable storage medium, for allowing an end-user to create and share annotated comments on an image published on a digital content platform, comprising:
   instruction, executable by at least one processing device, that when executed cause the processing device to
   (1) provide an annotation interface to allow a first end-user to create an annotation on an image published on a digital content platform,
   (2) provide a comment entry interface to receive a comment from the first end-user,
   (3) receive, link, and store the annotation and the comment in a database,
   (4) identify when a second end-user accesses the comment on the digital content platform,
   (5) display the annotation to the second end-user, wherein the display of the annotation to the second end-user is triggered when the second end-user accesses the comment,
   (6) match the image, annotation, or comment to an advertisement, and
   (7) display the advertisement to the second end-user proximate to the annotation, wherein the advertisement is contextually relevant to the image, annotation, or comment.

2. The non-transitory computer-readable storage medium of claim 1, wherein the comment is in the form of a character string.

3. The non-transitory computer-readable storage medium of claim 1, wherein the digital content platform is a webpage.

4. The non-transitory computer-readable storage medium of claim 1, wherein the digital content platform is a mobile application.

5. The non-transitory computer-readable storage medium of claim 1, further comprising:
   instruction, executable by at least one processing device, that when executed cause the processing device to
   (8) submit the image, annotation, or comment to an image analysis engine to match the image, annotation, or comment to the advertisement.

6. The non-transitory computer-readable storage medium of claim 5, wherein the image analysis engine includes an image recognition engine, a crowdsource network, or a proximate text recognition engine.

7. The non-transitory computer-readable storage medium of claim 1, wherein the annotation interface is a third-party in-image application.

8. The non-transitory computer-readable storage medium of claim 1, wherein the annotation includes a modification or addition to the image.

9. The non-transitory computer-readable storage medium of claim 1, wherein the annotation includes a link to a third-party website.

10. The non-transitory computer-readable storage medium of claim 1, wherein the annotation includes a link to a second digital content platform.

11. A computer-implemented method for allowing an end-user to create and share annotated comments on an image published on a digital content platform, wherein the method is performed by a computer processor, the method comprising:
(1) providing an annotation interface to allow a first end-user to create an annotation on an image published on a digital content platform;
(2) providing a comment entry interface to receive a comment from the first end-user;
(3) receiving and linking the annotation and the comment;
(4) identifying when a second end-user accesses the comment on the digital content platform;
(5) displaying the annotation to the second end-user, wherein the displaying of the annotation to the second end-user is triggered when the second end-user accesses the comment,
(6) matching the image, annotation, or comment to an advertisement, and
(7) displaying the advertisement to the second end-user proximate to the annotation, wherein the advertisement is contextually relevant to the image, annotation, or comment.

12. The computer-implemented method of claim 11, wherein the comment is in the form of a character string.

13. The computer-implemented method of claim 11, wherein the digital content platform is a webpage.

14. The computer-implemented method of claim 11, wherein the digital content platform is a mobile application.

15. The computer-implemented method of claim 11, further comprising:
(8) submitting the image, annotation, or comment to an image analysis engine to match the image, annotation, or comment to the advertisement.

16. The computer-implemented method of claim 15, wherein the image analysis engine includes an image recognition engine, a crowdsource network, or proximate text recognition engine.

17. The computer-implemented method of claim 11, wherein the annotation interface is a third-party in-image application.

18. The computer-implemented method of claim 11, wherein the annotation includes a modification or addition to the image.

19. The computer-implemented method of claim 11, wherein the annotation includes a link to a third-party website.

20. The computer-implemented method of claim 11, wherein the annotation includes a link to a second digital content platform.

21. A computer-implemented method for allowing an end-user to create and share annotated comments on an image published on a digital content platform, wherein the method is performed by a computer processor, the method comprising:
(1) providing an annotation interface to allow a first end-user to create an annotation on an image published on a digital content platform;
(2) providing a comment entry interface to receive a comment from the first end-user;
(3) receiving and linking the annotation and the comment;
(4) identifying when a second end-user accesses the image on the digital content platform;
(5) displaying the annotation and comment to the second end-user, wherein the displaying of the annotation to the second end-user is triggered when the second end-user accesses the image,
(6) matching the image, annotation, or comment to an advertisement, and
(7) displaying the advertisement to the second end-user proximate to the annotation, wherein the advertisement is contextually relevant to the image, annotation, or comment.

* * * * *